US011823192B2

(12) United States Patent
Dowling

(10) Patent No.: US 11,823,192 B2
(45) Date of Patent: *Nov. 21, 2023

(54) IDENTITY SERVICES SYSTEMS AND METHODS

(71) Applicant: Wells Fargo Bank, N.A., San Francisco, CA (US)

(72) Inventor: Michael M. Dowling, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/120,490

(22) Filed: Mar. 13, 2023

(65) Prior Publication Data

US 2023/0214836 A1    Jul. 6, 2023

Related U.S. Application Data

(63) Continuation of application No. 17/364,188, filed on Jun. 30, 2021, now Pat. No. 11,605,082, which is a continuation of application No. 15/363,974, filed on Nov. 29, 2016, now Pat. No. 11,055,713.

(60) Provisional application No. 62/264,595, filed on Dec. 8, 2015, provisional application No. 62/266,295, filed on Dec. 11, 2015.

(51) Int. Cl.
*G06Q 20/40* (2012.01)
*G06Q 20/38* (2012.01)

(52) U.S. Cl.
CPC ..... *G06Q 20/4014* (2013.01); *G06Q 20/3829* (2013.01)

(58) Field of Classification Search
CPC .............. G06Q 20/4014; G06Q 20/3829
See application file for complete search history.

(56) References Cited

U.S. PATENT DOCUMENTS 7,444,519 B2    10/2008    Laferriere et al.
7,509,672 B1    3/2009    Horwitz et al.
(Continued)

OTHER PUBLICATIONS

Albanese_2013_IEEE,pp. I-VIII.*
(Continued)

*Primary Examiner* — Michael I Ezewoko
(74) *Attorney, Agent, or Firm* — Foley & Lardner LLP

(57) ABSTRACT

Systems, methods, and apparatuses for storing verified identification information in a distributed database and for verifying entities to requestors are provided herein. Identity information relating to an entity is verified by a generally recognized identity provider (GRIP). Once verified, the GRIP populates a distributed database with an entry corresponding to the verified identity information. The distributed database is publically accessible such that identity requestors can see the entries in the distributed database. In some arrangements, the distributed database is write-protected such that only an authorized GRIP can modify the distributed database. An entity can provide information to a requestor to verify an identity attribute of the entity to the requestor. The requestor uses information provided by the entity to retrieve verified entity identification information from the distributed database and to confirm that the identity attribute was verified by an authorized GRIP.

18 Claims, 7 Drawing Sheets

(56) References Cited

U.S. PATENT DOCUMENTS

| | | | |
|---|---|---|---|
| 7,769,690 B2 | 8/2010 | Dare et al. | |
| 8,522,039 B2* | 8/2013 | Hyndman | G07C 9/20 |
| | | | 713/185 |
| 8,881,247 B2* | 11/2014 | Mendelovich | H04L 9/3213 |
| | | | 713/186 |
| 8,887,229 B1* | 11/2014 | Ellmore | H04L 63/168 |
| | | | 726/1 |
| 9,307,034 B1* | 4/2016 | Keyani | H04L 67/53 |
| 9,978,062 B2* | 5/2018 | Raj | G06Q 20/3821 |
| 10,755,327 B2* | 8/2020 | Nagla | H04L 9/3247 |
| 2004/0143521 A1 | 7/2004 | Barnard et al. | |
| 2005/0278547 A1 | 12/2005 | Hyndman et al. | |
| 2006/0080730 A1 | 4/2006 | Cahill et al. | |
| 2006/0236382 A1 | 10/2006 | Hinton et al. | |
| 2009/0177587 A1 | 7/2009 | Siegal et al. | |
| 2009/0300355 A1* | 12/2009 | Crane | H04L 63/0807 |
| | | | 713/168 |
| 2011/0276485 A1 | 11/2011 | Varga | |
| 2012/0209735 A1 | 8/2012 | Subramanian et al. | |
| 2015/0067813 A1 | 3/2015 | Cha et al. | |
| 2015/0156192 A1 | 6/2015 | Yang et al. | |
| 2015/0379510 A1* | 12/2015 | Smith | G06Q 20/3829 |
| | | | 705/71 |
| 2017/0048216 A1* | 2/2017 | Chow | H04L 63/0876 |
| 2019/0333054 A1* | 10/2019 | Cona | G06Q 20/383 |

OTHER PUBLICATIONS

Damiani_2006_Springer, pp. 133-147.*
Stallings, 2016, pp. 1-33.*
Torres, IEEE, pp. 787-802.*
"Federated Identity Pattern", https://msdn.microsoft.com/en-us/library/dn589790(d=printer).aspx, Microsoft, 2016. 5 pages.
Ernesto Damiani et al., "Data and Applications Security XX", 2006 Springer, pp. 133-147, 19 pages.
Goodrich et al., "Notarized Federated Identity Management for Web Services", Department of Computer Science, University of California and Department of Computer Science, Brown University, LNCS 4127, pp. 133-147, 2006. 15 pages.
Massimiliano Albanese et al., "A Moving Target Defense Mechanism for MANETs Based on Identity Virtualization", 2013 IEEE Conference on Communications and Network Security (CNS), 9 pages.
Michael T. Goodrich et al., "Notarized Federated Identity Management for Web Services", Data and Applications Security XX, 20th Annual IFIP WB 11.3 Working Conference on Data and Applications Security Sophia Antipolis, France, Jul./Aug. 2006, Proceedings, Springer, 19 pages.

* cited by examiner

| Token | Attribute | Value | Entity's Signature | Entity's Public key |
|---|---|---|---|---|
| A5B5949B-C600-4AF4-A1ED-971CFB41A068 | Surname | Smith | 9898sf98s7 f98sf79s87f9s 8f79s87f9as8 7f9s87f9s8f79 s87fs9a87fs | 58987539857389573498573 4985739958734 |
| B5B5949B-C600-4AF4-A1ED-971CFB41A069 | Given Name | John | dfokdjf;l dlkfkdfldfj;kj fpojfkj lf;kasjdf;lkjf98 7988898 98798 89 | 58987539857389573498573 4985739958734 |
| C5B5949B-C600-4AF4-A1ED-971CFB41A070 | Date of Birth | 1977-Nov-25 12:35:00 GMT | 789769876 98 8976 9876 9876 9876 9876 9876 89768976876 8976 8976 | 58987539857389573498573 4985739958734 |

| Token | Attribute | Entity's Signature | Entity's Public Key | Chip's Signature |
|---|---|---|---|---|
| A5B5949B-C600-4AF4-A1ED-971CFB41A068 | Surname | 9898sf98s7 f98sf79s87f9s 8f79s87f9as8 7f9s87f9s8f79 s87fs9a87fs | 5898753985738957349857 3498573 49857395 8734 | 8878374938bb8b8478274b89247b92 8347847b2389742398 4723 |
| B5B5949B-C600-4AF4-A1ED-971CFB41A069 | Given Name | dfokdjf;l dlkfkdfldfljkj fpojfkj lf;kasjdf;lkjf98 7988898 98798 89 | 5898753985738957349857 3498573 49857395 8734 | 98734987249 8h7239847238 42894b72 894b728934b78923b4 9823b748932b 748923b47 |
| C5B5949B-C600-4AF4-A1ED-971CFB41A070 | Date of Birth | 7897769876 98 8976 9876 9876 9876 9876 9876 89768 97 68976 8976 8976 | 5898753985738957349857 3498573 49857395 8734 | 4365 12563 sdd5sd4356654cx65c56ccx 6c65cx654cx16524c365 1243c625cx |

FIG. 5

| Token | Attribute | Value | Entry's Signature | Entry's Public Key |
|---|---|---|---|---|
| A5B5949B-C600-4AF4-A1ED-971CFB41A068 | Surname | Smith | 9898sf98s7 f98sf79s87f9s 8f79s87f9as8 7f9s87f9s8f79 s87fs9a87fs | 58987539857389573498573 4985739587934 |
| B5B5949B-C600-4AF4-A1ED-971CFB41A069 | Given Name | John | dfokdjf;l dlkfkdfldfj;kj fpojfkj lfkasjdfrikjf98 7988898 98798 89 | 58987539857389573498573 4985739587934 |
| C5B5949B-C600-4AF4-A1ED-971CFB41A070 | Date of Birth | 1977-Nov-25 12:35:00 GMT | 78976 9876 98 8976 9876 9876 9876 9876 9876 897689768976 8976 8976 | 58987539857389573498573 4985739587934 |

ND METHODS

IDENTITY SERVICES SYSTEMS AND METHODS

CROSS-REFERENCE TO RELATED APPLICATIONS

This application is a continuation of U.S. patent application Ser. No. 17/364,188, entitled "IDENTITY SERVICES SYSTEMS AND METHODS," FILED ON Jun. 30, 2021, which is a continuation of U.S. patent application Ser. No. 15/363,974, entitled "IDENTITY SERVICES SYSTEMS AND METHODS," filed on Nov. 29, 2016, which claims priority to U.S. Provisional Patent Application No. 62/264,595, entitled "IDENTITY SERVICES SYSTEMS AND METHODS," by Michael D. Dowling., filed on Dec. 8, 2015, and claims priority to U.S. Provisional Patent Application No. 62/266,295, entitled "IDENTITY SERVICES SYSTEMS AND METHODS," by Michael D. Dowling., filed on Dec. 11, 2015, each of which are herein incorporated by reference in their entireties and for all purposes.

TECHNICAL FIELD

Embodiments of the present disclosure relates to systems and methods for providing verified identity information.

BACKGROUND

Typically, a person verifies presents their identity to an entity, the person presents a government-issued document (e.g., a driver's license) to the entity. Although the entity may only be interested in verifying the person's age or name, the government-issued documents often include other information that the person may not wish to share with the entity. For example, a merchant may ask to see a person's driver's license to verify that the person is the account holder of a credit card. However, other than the person's name, the driver's license includes additional information, such as the person's address, the person's weight, the person's organ donor status, driver's license number, etc. The merchant does not need this information. Further, the person may not wish to share this information with the merchant. This represents a serious breach of security for the person, who has now presented the non-required information to the merchant.

In addition, while there have been advances in anti-counterfeiting technology in government-issued identification documents (e.g., holograms in ID cards, RFID chips, etc.), these documents are generally counterfeited easily upon release. Fraudsters are able to produce sophisticated fraudulent documents that resemble authentic government-issued identification documents (e.g., fake driver's licenses, fake passports, fake birth certificates, etc.) and that are nearly impossible to distinguish from genuine versions of the government-issued identification documents. The increasing sophistication of the fraudulent documents make it difficult or impossible for a requesting entity to authenticate a received document as authentic.

Further, the increasing use of digital identities (e.g., social media profiles, username/password schemes, etc.) has introduced additional authentication issues. For example, it may be possible for a fraudster to either claim they own somebody else's social media profile or to create a fraudulent social media profile for a fraud target. Further, username and password combinations are often easily misappropriated by fraudsters.

SUMMARY

Various example embodiments relate to systems, methods, and apparatuses for storing verified identification information in a distributed database and for verifying entities to requestors are provided herein. One such example embodiment relates to a method of verifying a digital identification attribute. The method includes receiving, by a requestor computing system associated with a requestor, a data package from an entity computing system associated with an entity that is presenting the digital identification attribute to the requestor for authentication. The data package includes the digital identification attribute. The method further includes requesting, by the requestor computing system, an entry including the digital identification attribute from a distributed database. The method includes receiving, by the requestor computing system, the entry from the distributed database. The entry includes an entity signature formed by an entity private key associated with the entity. The method further includes verifying, by the requestor computing system, the entity signature with an entity public key associated with the entity.

Another example embodiment relates to a requestor computing system. The requestor computing system includes a network interface structured to facilitate data communication with an entity computing system and a distributed database. The requestor computing system further includes memory a processor. The processor is configured to receive a data package from the entity computing system, the entity computing system associated with an entity that is presenting a digital identification attribute to the requestor computing system for authentication. The data package includes the digital identification attribute. The processor is further configured to request an entry from the distributed database, the entry including the digital identification attribute. The processor is configured to receive the entry from the distributed database, the entry including an entity signature formed by an entity private key associated with the entity. The processor is further configured to verify the entity signature with an entity public key associated with the entity.

These and other features, together with the organization and manner of operation thereof, will become apparent from the following detailed description when taken in conjunction with the accompanying drawings.

BRIEF DESCRIPTION OF THE FIGURES

FIG. 4 is an example set of identity information received by a generally recognized identity provider of the computing system of FIG. 1.

FIG. 5 is an example entry in the distributed database of the computing system of FIG. 1 as created by the method of FIG. 3.

FIG. 7 is an example data package transmitted from an entity to a requestor during the method of FIG. 6.

DETAILED DESCRIPTION

Referring to the Figures generally, systems, methods, and apparatuses for storing verified identification information in a distributed database and for verifying entities to requestors are provided herein. According to the present disclosure, identity information relating to an entity is verified by a generally recognized identity provider (GRIP). Once verified, the GRIP populates a distributed database with an entry corresponding to the verified identity information. In some arrangements, at least a portion of the entry is encrypted. The distributed database uses a public key infrastructure to secure the data entries. The distributed database is publically accessible such that identity requestors can see the entries in the distributed database. In some arrangements, the distributed database is write-protected such that only an authorized GRIP can modify the distributed database. Through the below-described systems and methods, an entity can provide information to a requestor to verify an identity attribute of the entity to the requestor. The requestor uses information provided by the entity to retrieve verified entity identification information from the distributed database and to confirm that the identity attribute was verified by an authorized GRIP.

Figure 1:
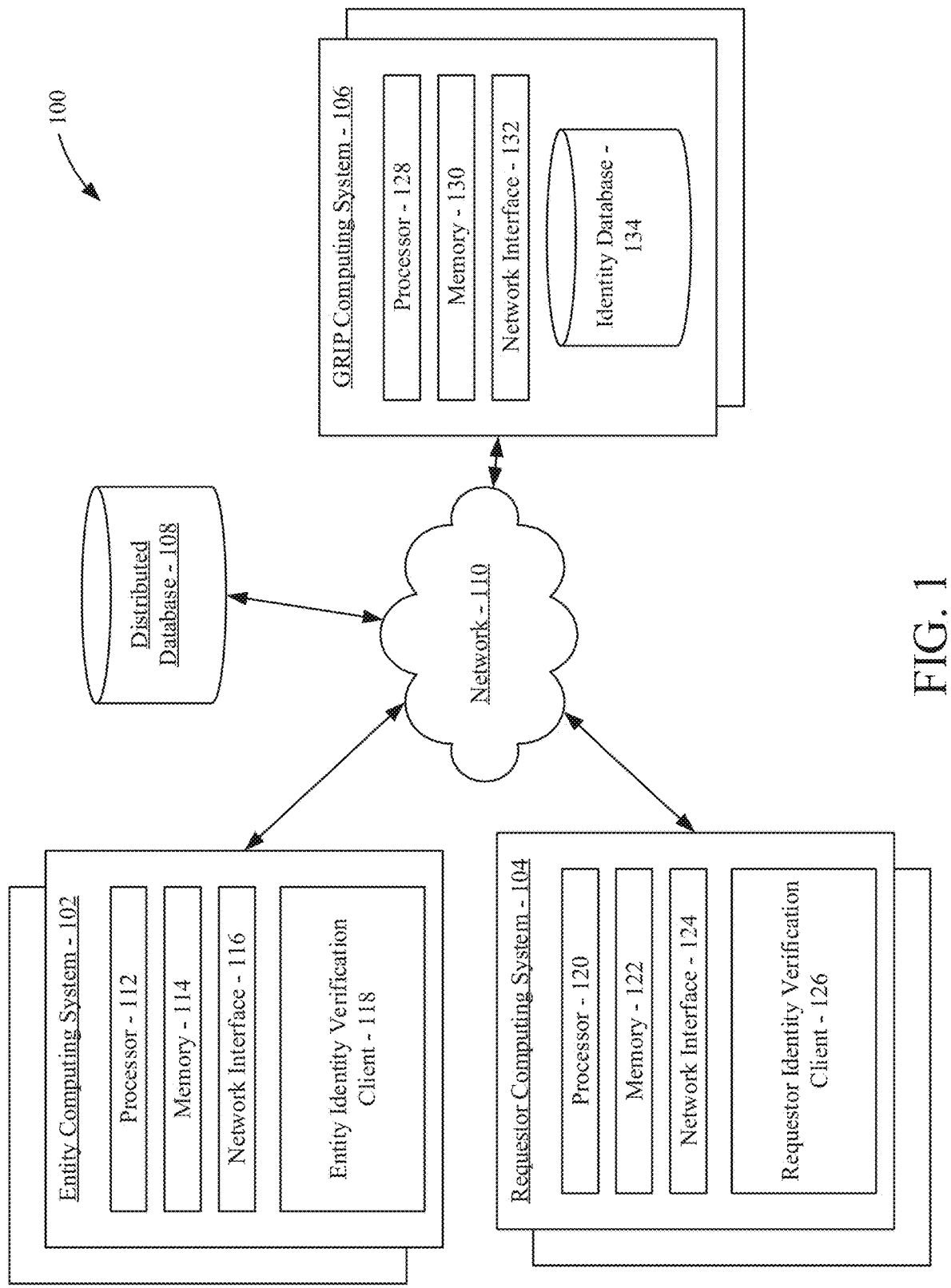
FIG. 1 is a diagram of a computing system according to an example embodiment.

Referring to FIG. 1, a block diagram of a computing system 100 is shown according to an example embodiment. As described herein, the computing system 100 allows for entities to have their identifications (and/or identity attributes) authenticated and distributed in a verified manner. As used herein, an "entity" is a person, device, company, or another entity that has an identity formed of identity attributes which can be verified and distributed through the computing system 100. An identity attribute refers to a specific portion of an entity's identity, such as a surname, given name, date of birth, photo image, taxpayer ID, social security number, address, principal place of business, phone number, e-mail address, height, weight, sex, race, religion, or any other attribute associated with the identity of the entity.

The computing system 100 includes a plurality of entity computing systems 102. Each of the entity computing systems 102 is associated with an entity. The computing system 102 includes a plurality of requestor computing systems 104. Each of the requestor computing systems 104 is associated with a requestor that is verifying the identity or an identity attribute of a given entity. The computing system 102 further includes at least one GRIP computing system 106. Each of the GRIP computing systems 106 is associated with a GRIP. Additionally, the computing system 102 includes a distributed database 108. As described in further detail below, the distributed database 108 is populated by the GRIP computing systems 106 with encrypted and verified identity attribute information relating to the entities. The distributed database 108 is accessible by the requestor computing systems 104 to verified identity information received from the entities. The components of the computing system 100 are communicably and operatively coupled to each other over a network 110. The network 110 may be any type of type of network. For example, the network 110 include a wireless network interface (e.g., 802.11X, ZigBee, Bluetooth, Internet, etc.), a wired network interface (e.g., Ethernet, USB, Thunderbolt, etc.), or any combination thereof. The network 110 is structured to permit the exchange of data, values, instructions, messages, and the like between and among the entity computing systems 102, the requestor computing systems 104, the GRIP computing systems 106, and the distributed database 108.

Each of the entity computing systems 102 includes a processor 112, memory 114, and a network interface 116. The processor 112 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the entity computing system 102. The memory 114 (e.g., RAM, ROM, NVRAM, Flash Memory, hard disk storage, etc.) may store data and/or computer code for facilitating at least some of the various processes described herein. In this regard, the memory 114 may store programming logic that, when executed by the processor 112, controls the operation of the entity computing system 102. The network interface 116 is structured to allow the entity computing system 102 to communicate data to and from other devices (e.g., a requestor computing system 104, a GRIP computing system 106, etc.) either directly or via the network 110. Each of the entity computing systems 102 includes an entity identity verification client 118. As discussed in further detail below, the entity identity verification client 118 allows the entity computing system 102 to communicate identity information to a requestor computing system 104 during an entity authentication sequence.

Still referring to FIG. 1, each of the requestor computing systems 104 includes a processor 120, memory 122, and a network interface 124. The processor 120 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the requestor computing system 104. The memory 122 (e.g., RAM, ROM, NVRAM, Flash Memory, hard disk storage, etc.) may store data and/or computer code for facilitating at least some of the various processes described herein. In this regard, the memory 122 may store programming logic that, when executed by the processor 120, controls the operation of the requestor computing system 102. The network interface 124 is structured to allow the requestor computing system 102 to communicate data to and from other devices (e.g., an entity computing system 102, a GRIP computing system 106, the distributed database 108, etc.) either directly or via the network 110. Each of the requestor computing systems 104 includes an requestor identity verification client 126. As discussed in further detail below, the requestor identity verification client 126 allows the requestor computing system 104 to receive identity information from an entity computing system 102 and to verify received identity attributes with the distributed database 108 during an entity authentication sequence.

Each of the GRIP computing systems 106 includes a processor 128, memory 130, and a network interface 132. The processor 128 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the GRIP computing system 106. The memory 130 (e.g., RAM, ROM, NVRAM, Flash Memory, hard disk storage, etc.) may store data and/or computer code for facilitating at least some of the various processes described herein. In this regard, the memory 130 may store programming logic that, when executed by the processor 128, controls the operation of the GRIP computing system 106. The network interface 132 is structured to allow the GRIP computing system 106 to communicate data to and from other devices (e.g., an entity computing system 102, a requestor computing system 104, the distributed database 108, etc.) either directly or via the network 110. In some arrangements, a GRIP computing system 106 includes an identity database 134. The identity database 134 stores genuine identity information relating to entities associated with the GRIP. For example, if the GRIP is a financial institution, the identity database 134 may include to customer account information. As another example, if the GRIP is a government entity (e.g., a department of motor vehicles, a state department, a tax department, etc.), the identity database 134 may include government-issued identification information (e.g., driver's license information, passport information, tax information, etc.).

The distributed database 108 includes a plurality of entries containing confirmed identity information relating to the entities. In some arrangements, each entry relates to a single attribute. In other arrangements, each entry relates to a single entity and contains all confirmed identity information relating to that entity. The confirmed identity information relates to identity attributes that have been confirmed by a GRIP as being authentic and genuine and as relating to an associated entity. The distributed database 108 is publically available meaning that all devices in the computing system 100 can read data from the distributed database 108. However, in some arrangements, the distributed database 108 is write-restricted such that only the GRIP computing systems 106 can write data to the distributed database 108. The entries in the distributed database 108 are protected by a public key infrastructure.

Referring to the computing system 100, identity information relating to each entity requires confirmation by a GRIP and publishing to the distributed database 108 in order for the identity information to be considered valid (i.e., genuine and verified as being authentic by a GRIP) in the computing system 100. In some arrangements, different identity attributes require different verification processes from different GRIPs in order to be confirmed and published to the distributed database 108. For example, private personal information (e.g., name, address, social security number, bank account information, etc.) may require a higher level of verification, while public information (e.g., social media account ownership information) may require a lower level of verification. Accordingly, identity attributes may be split into several segments, with each segment requiring a more or less strict set of confirmation procedures. Each different segment is referred to as a "GRIP level." A given GRIP is certified to confirm attributes within a given GRIP level. Accordingly, in some arrangements, multiple GRIPs are required to confirm multiple different types of identity attributes.

Figure 2:
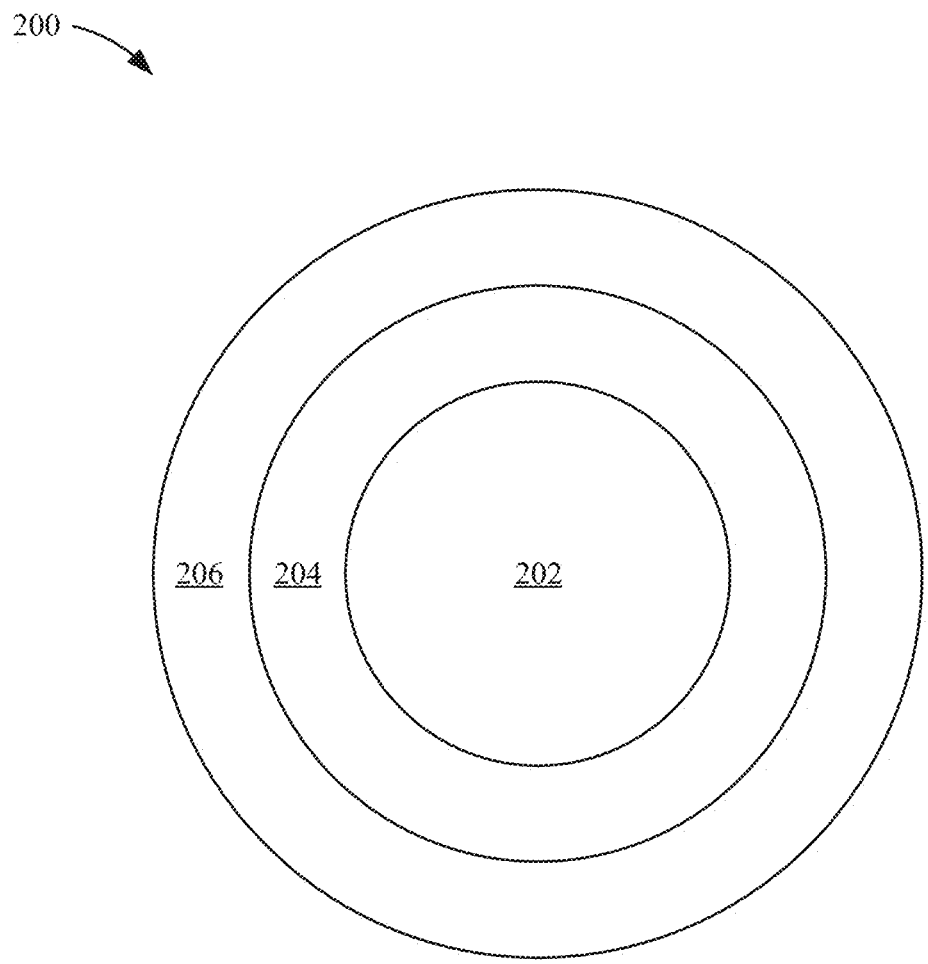
FIG. 2 is a diagram of attribute levels according to an example embodiment.

Referring to FIG. 2, a diagram 200 of different GRIP levels is shown according to an example embodiment. The diagram 200 assists with the explanation of the different types of GRIPs that may be needed in certain multi-GRIP level arrangements of the computing system 100. In the diagram 200, the GRIP levels are conceptualized as a set of concentric circles. The innermost concentric circle is a first GRIP level 202. Identity attributes associated with the first GRIP level 202 (i.e., first level identity attributes) are core identity attributes of a physical being (e.g., a person). The first level identity attributes are the most security-sensitive attributes (e.g., most protected), and thus, require the most stringent certification process. Example first level identity attributes may include any of surname, given name, date of birth, taxpayer ID, social security number, state identification information, federal identification information, local identification information, personal identification photographs, physical attributes, and the like. The first level identity attributes are generally found in government-issued documents (e.g., passports, state IDs, military IDs, etc.) or documents that can lead to identity theft or other fraud (e.g., financial institution documents). These first level identity attributes require the strictest set of rules, regulations, and processes for confirmation by a GRIP. Accordingly, only certain GRIPs may be permitted to confirm first level identity attributes falling within the first GRIP level 202, which are referred to as first level GRIPs. For example, potential first level GRIPs may include government agencies (e.g., departments of motor vehicles, passport offices, etc.), financial institutions, and other independent organizations certified by another first level GRIP.

The middle concentric circle is a second GRIP level 204. Identity attributes associated with the second GRIP level 204 (i.e., second identity level attributes) are attributes relating to non-conscious entities (e.g., a physical structure, a device, a charted organization, a business, etc.). For example, if the entity is a corporate entity, the second level identity attribute may be any of a corporate name, an employer identification number, a taxpayer ID, an organization type (e.g., corporation, LLC, etc.), a ticker symbol, or the like. If the entity is a physical building, the second level identity attribute may be any of an address, a lot identifier, a number of floors, a building capacity, a building type, or the like. If the entity is a public property, the second level identity attribute may be any of an address, a type (e.g., park, art installation, etc.), or the like. In some arrangements, the second level identity attributes are publically available. Only certain GRIPs may be permitted to confirm second level identity attributes falling within the second GRIP level 204, which are referred to as second level GRIPs. For example, potential second level GRIPs may include local or state government record agencies, land assessors, notary publics, and other independent organizations certified by another second level GRIP.

The outermost concentric circle is a third GRIP level 206. Identity attributes associated with the third GRIP level 206 (i.e., third level identity attributes) are attributes relating to data about the entity that require confirmation by the relevant third-party associated with the attributes. For example, a third level identity attribute may be a social media profile (e.g., a Facebook® profile, a LinkedIn® profile, etc.) that is unique to the social media website. In this situation, the GRIP may be the social media website itself. Third level identity attributes require the least strict confirmation procedures. In some arrangements, third level identity attributes describe an entity but do not uniquely identify the entity. For example, a third level identity attribute may be a MAC address of a smartphone associated with a person. Accordingly, when the person presents the smartphone (e.g., to a network) the person can be authenticated and provided access to the network. Only certain GRIPs may be permitted to confirm second level identity attributes falling within the third GRIP level 206, which are referred to as third level GRIPs. As noted above, potential third level GRIPs may include social media websites, network administrators, the entity itself, and the like.

Although only three GRIP levels (202, 204, and 206) are shown in the diagram 200, it should be understood that any number of GRIP levels can exist in the computing system 100. For example, a fourth GRIP level can be added which relates to entity-defined attributes that are confirmed by the entity itself.

A given GRIP is also provided revoke privileges with respect to identity information published in the distributed database 108. For example, if person moves to a new address, and the old address is no longer valid, the person may request the GRIP that confirmed and published the old address to the distributed database 108 to revoke the old address from the distributed database 108. In some arrangements, when identity information is revoked from the distributed database, the identity information is deleted or removed from the distributed database 108. In other arrangements, the revoked identity information remains in the distributed database 108 and is marked as "revoked." A date may be attached to the revoked marking. In such arrangements, the distributed database 108 serves as an identity trail that builds a historic record of identity information changes of an entity (e.g., name changes, address changes, physical attribute changes, incorporation changes, financial changes, property ownership changes, etc.).

The operation of the computing system 100 is described in further detail below with respect to FIGS. 3 through 7. Specifically, the process of populating the distributed database 108 is described with respect to FIG. 3. The process of verifying a received identity attribute through the distributed database 108 is described with respect to FIG. 6.

Figure 3:
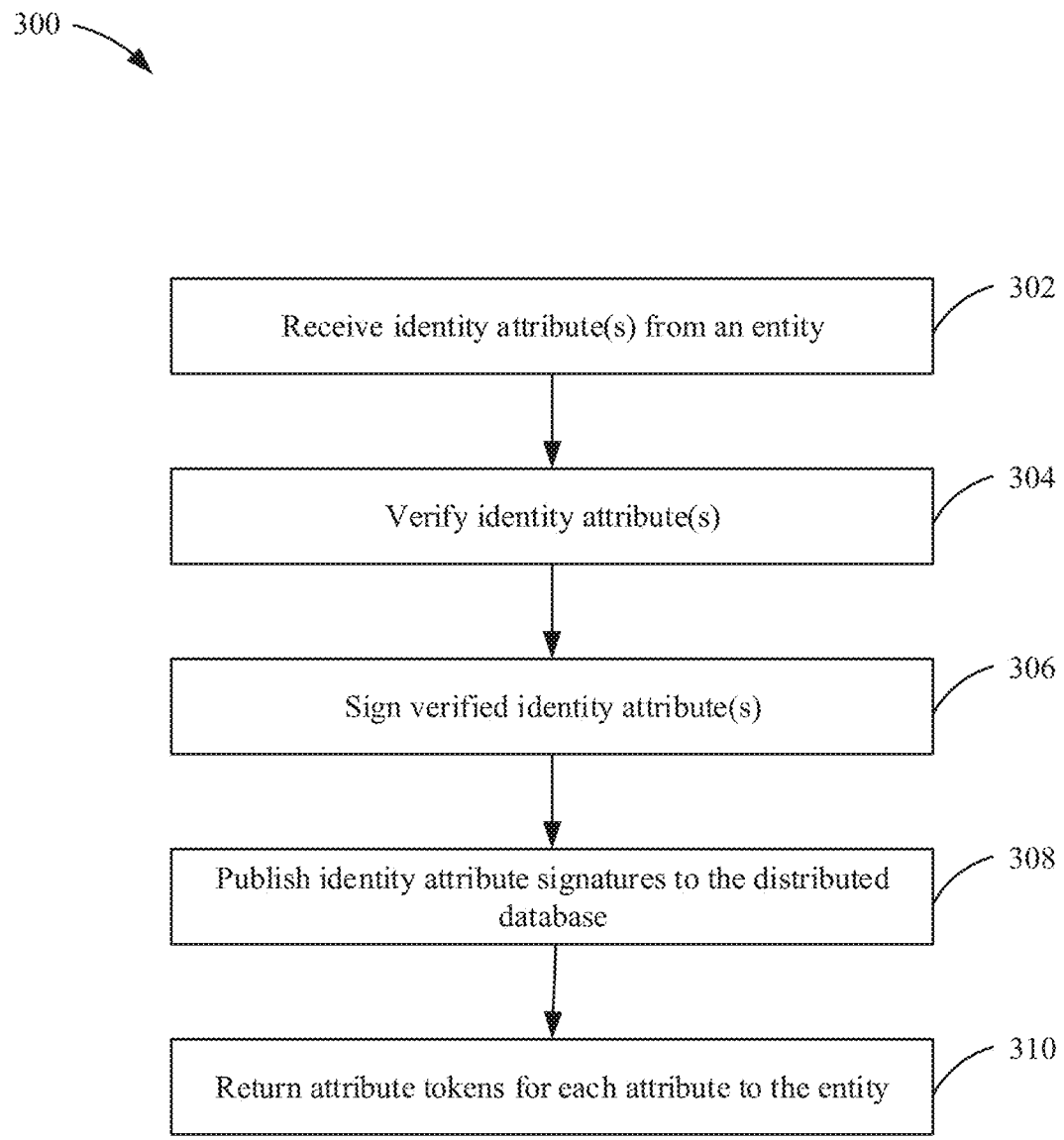
FIG. 3 is a flow diagram of a method of populated the distributed database of the computing system of FIG. 1 according to an example embodiment.

Referring to FIG. 3, a flow diagram of a method 300 of populating the distributed database 108 is described according to an example embodiment. The method 300 is performed by a GRIP computing system 106. Generally, the GRIP computing system 106 receives identity information from an entity (e.g., identity attributes), verifies the received identity information in an appropriate manner to the attribute's standard GRIP level, and publishes an identity owner's signature of the verified attributes along with the identity owner's public key and the GRIP's signature, which verifies that the attribute was confirmed by a GRIP at the appropriate level.

The method 300 begins when at least one identity attribute is received from an entity at 302. The identity attribute includes an identification of the attribute type (e.g., surname, given name, date of birth, etc.) and a value of the attribute (e.g., the entity's surname, the entity's given name, the entity's date of birth, etc.). In some arrangements, identity attribute is digitally transferred to the GRIP computing system 106 from an entity computing system 102. In such arrangements, the identity attribute is received along with an entity public key, a signature of the identity attribute (e.g., formed by signing the identity attribute with an entity private key), and a unique token associated with the identity attribute. An example set 400 of received identity attributes is shown in FIG. 4. In other arrangements, the identity attribute is from a physical document (e.g., a driver's license, a passport, a property deed, etc.). In such arrangements, the entity (e.g., the person if the entity is a person, a company representative if the entity is a company, etc.) physically passes the physical document to the GRIP for manual verification. For each identity attribute provided to the GRIP computing system 106, the entity also provides the required documentation and/or information needed by the GRIP computing system 106 to confirm or verify the provided identity attribute as belonging to or being associated with the entity.

The identity attributes are verified at 304. The GRIP computing system 106 verifies the received the identity attribute. The GRIP computing system 106 verifies the received attribute(s) using best practices established during certification of the GRIP. In some arrangements, the identity attribute is manually verified by comparing the received attribute to one or more forms of government-issued documents (e.g., by comparing a name on a driver's license and a passport to a provided name). In other arrangements, the identity attribute is verified by comparing the received identity attribute with a known identity attribute (e.g., as stored in the identity database 134). The description of the method 300 proceeds under the assumption that the identity attribute is successfully verified. If the identity attribute is not verified, the method 300 ends.

The identity attributes are signed at 306. After the identity attribute is verified or confirmed by the GRIP, the GRIP computing system 106 generates a GRIP-specific signature for each received and verified attribute. The GRIP-specific signature proves that the attribute was confirmed by the GRIP. In some arrangements, the GRIP computing system 106 uses a GRIP private key and a GRIP public key to do so. In such an arrangement, the GRIP computing system 106 signs the verified identity attribute with the GRIP private key to form the GRIP-specific signature such that the GRIP-specific signature can be verified with the GRIP public key. In some arrangements, the GRIP computing system combines the attribute type (e.g., surname), the attribute value (e.g., Smith), the entity's signature, and the entity public key to create a sha-256 hash. The sha-256 hash is then used as a base to generate a signature using the GRIP private key.

The identity attribute signatures are published to the distributed database 108 at 308. The GRIP computing system 106 adds the identity attribute signature as a new entry into the distributed database 108. At this point, the entity's identity attribute is securely published in the distributed database 108. An example entry 500 in the database 108 is shown in FIG. 5. The entry 500 is associated with the example set of FIG. 4. As shown in FIG. 5, the entry 500 includes the identity attribute's token, attribute label (e.g., surname), the entity's signature of the value of the attribute, and the GRIP's signature that includes data from all of these attributes. As a result, while the identity labels are published, the value of reach label is completely masked by the entity's signatures and, even with the entity's private key, cannot be decrypted due to the intermediate conversion of the attribute value to a sha-256 hash.

For each verified and published attribute, a token is returned to the entity computing system 102 at 310. The GRIP computing system 106 returns a token for each verified attribute to the entity computing system 102. The token can then be used by the entity during identity verification to an identity requestor. The entity is responsible for maintaining a mapping between a given token and the corresponding attribute.

Figure 6:
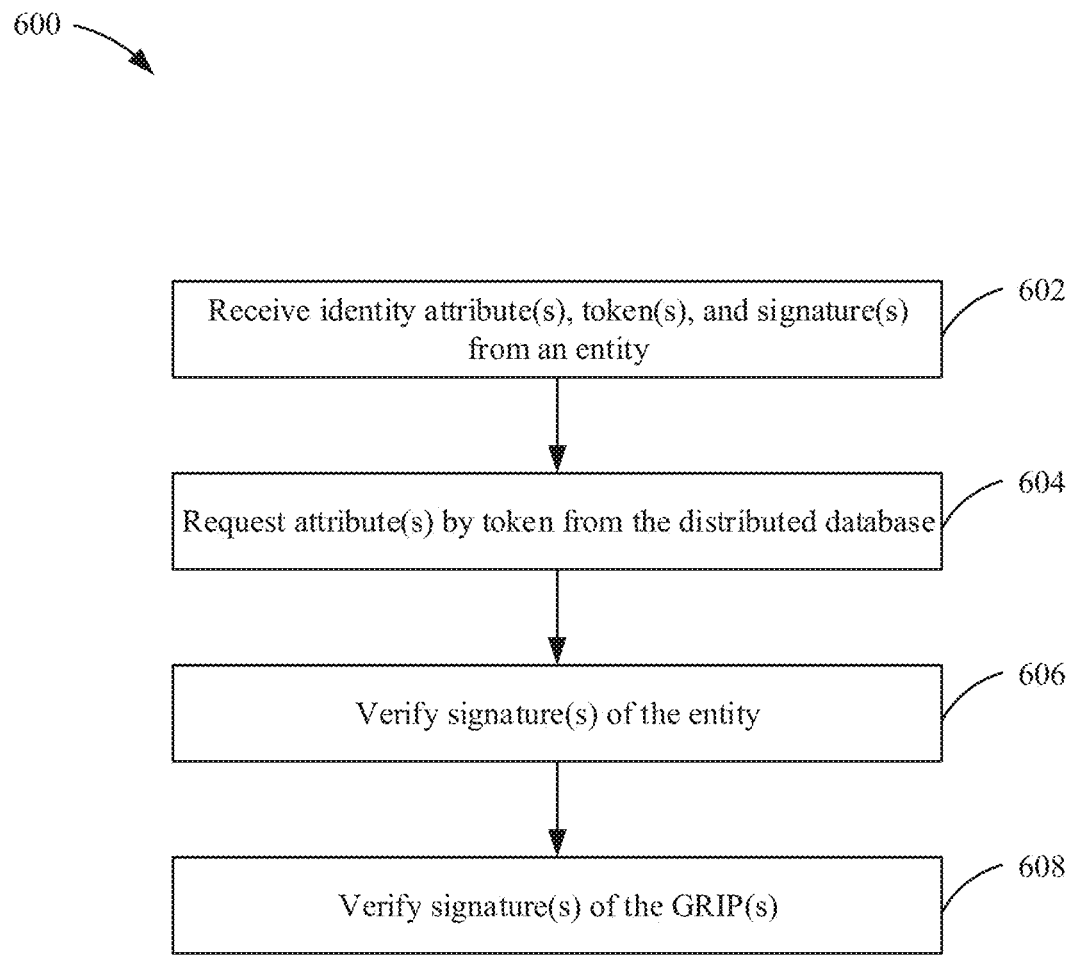
FIG. 6 is a flow diagram of a method of verifying a received identity attribute through the distributed database of the computing system of FIG. 1.

Referring to FIG. 6, a flow diagram of a method 600 of verifying a received digital identity attribute through the distributed database 108 is described according to an example embodiment. The method 600 is performed by a requestor computing system 104. The method 600 begins when at least one identity attribute, at least one a token, and at least one a signature are received at 602. In some arrangements, the number of tokens and signatures received are each equal to the number of identity attributes received. For ease of discussion with respect to the method 600, it is assumed that a single identity attribute is received, and thus, a single token and a single signature are also received. The identity attribute is a digital identity attribute in that it is verifiable through public key infrastructure encryption. The requestor computing system 104 receives the identity attribute, the token, and the signature from an entity computing system 102. The identity attribute, the token, and the signature may be received as a single data package. An example data package 700 is shown in FIG. 7.

As shown in FIG. 7, the data package 700 relates to the transmission of three different identity attributes: surname, given name, and date of birth. Each of the identity attributes includes an identification of the attribute type (e.g., surname, given name, date of birth, etc.) and a value of the attribute (e.g., the entity's surname, the entity's given name, the entity's date of birth, etc.). Each of the identity attributes includes a unique token. In some arrangements, the unique token is a locator that points to a specific location within the distributed database 108 where the identified identity attribute entry can be located. Each of the identity attributes includes an entity signature (formed by signing the identity attribute with an entity private key in the same manner as described above with respect to the method 300) and the entity's public key. The entity's public key is used to verify the entity's signature.

Referring again to FIG. 6, the data package containing the identity attribute, the token, and the signature can be transmitted from the entity computing system 102 to the requestor computing system 104 in a number of different ways. In some arrangements, the data package is transmitted via a close-proximity direct data connection between the entity computing system 102 and the requestor computing system 104. In such arrangements, the close-proximity direct data connection may be a Bluetooth connection, a near-field communication ("NFC") connection, an integrated circuit (e.g., EMV chip) transfer, or the like. For example, an entity (e.g., a person) can tap a smartphone (e.g., the entity computing system 102) to the requestor computing system 104 (e.g., a point-of-sale system, another smartphone, etc.) to initiate a data transfer via NFC, Bluetooth, or the like. In other arrangements, the data package is presented as a barcode (e.g., a two-dimensional barcode, a QR Code, etc.) on a display of the entity computing system 102 such that it can be scanned by a reader (e.g., a camera) of the requestor computing system 104. In further arrangements, the data package is transmitted from the entity computing system 102 to the requestor computing system 104 via the network 110. In each of the above transmission channels, the data package transmission is facilitated by the entity identity verification client 118 and the requestor identity verification client 126.

The received attribute is requested from the distributed database 108 based on the token at 604. The requestor computing system 104 access the distributed database 108 via the network 110. The requestor computing system 104 identifies the appropriate entry within the distributed database 108 by matching the received token with the stored token in the distributed database 108. In some arrangements, the distributed database 108 includes a query or search feature that allows requestors to input the token and receive the identified database entry. In other arrangements, the query or search feature is part of the requestor identity verification client 126. The received entry from the distributed database 108 includes the token identifier, the identity attribute type, the entity's signature, the entity's public key, and the GRIP's signature (e.g., as shown in FIG. 5). In some arrangements, the received entry also includes an identity of the GRIP that verified the entry.

The signature of the entity is verified at 606. Once the requestor computing system 104 has the data entry with the signatures from the distributed database 108, the requestor computing system 104 verifies the entity's signature for the attribute using the entity's public key. If the signature of the entity is verified, the requestor computing system 104 concludes that the identity information provided to the requestor at 602 is considered valid and confirmed. If the signature of the entity cannot be verified by the requestor computing system 104, the identity attribute is not verified, and the method 600 ends. For the purposes of completing the explanation of the method 600, the description of the method 600 continues under the assumption that the signature of the entity was verified at 606.

The signature of the GRIP is verified at 608. The requestor computing system 104 then verifies the GRIP signature to verify that the identity attribute was published to the distributed database 108 by an approved GRIP. Based on the identity of the GRIP, the requestor computing system 104 retrieves the appropriate GRIP public key (e.g., from a public key database). The requestor computing system 104 verifies the GRIP's signature for the attribute using the GRIP public key. If the signature of the GRIP is verified, the requestor computing system 104 concludes that the identity information provided to the requestor at 602 is considered valid and confirmed, and that the identity information was properly published to the distributed database 108 by an authorized GRIP. If the signature of the GRIP cannot be verified by the requestor computing system 104, the identity attribute is not verified, and the method 600 ends.

In some arrangements, after the entity signature and the GRIP signature are verified, the requestor computing system 104 generates an approval message. The approval message indicates that the provided identity attribute has been confirmed as both authentic and verified by an authorized GRIP. The requestor computing system 104 may transmit the approval message to the entity computing system 102.

The above-described systems and methods provide for improved identity authentication systems that allow entities (e.g., people) to authenticate themselves on an attribute-by-attribute basis instead of providing too much sensitive information. For example, if a person is attempting to authenticate themselves for a purchase of alcohol (requiring that the person is at least 21 years of age), the person can just provide the alcohol seller (e.g., store, bar, restaurant, etc.) with just their age, thereby avoiding the provision of unnecessary information (e.g., address, height, weight, driver's license number, etc.).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of verifying a digital identification attribute, the method comprising:
   accessing, by a requestor computing system, a distributed database maintained by a plurality of identity providers, each identity provider populating the distributed database with respective entries relating to attributes of entities, wherein a first identity provider populates the distributed database with a first attribute having a first security sensitivity and a second identity provider populates the distributed database with a second attribute having a second security sensitivity, wherein the distributed database comprises a historic record of identity information changes of the entities, the historic record updated responsive to the identity providers populating the distributed database with updated attributes;

receiving, by the requestor computing system, a data package from an entity computing system associated with an entity that is presenting a digital identification attribute for authentication, the data package including the digital identification attribute;

requesting, by the requestor computing system, an entry including the digital identification attribute from the distributed database;

receiving, by the requestor computing system, the entry from the distributed database, the entry including a first signature formed by an entity private key associated with the entity and a second signature associated with an identity provider of the plurality of identity providers which populated the entry to the database;

verifying, by the requestor computing system, the first signature and the second signature, and that the identity provider has a security level for populating the entry to the database using an entity public key associated with the entity and a public key associated with the identity provider; and transmitting, by the requestor computing system to the entity computing system, an approval message indicating that the digital identity attribute has been confirmed as both authentic and verified by an authorized identity provider.

2. The method of claim 1, wherein the second identity provider is permitted to populate the distributed database with the second attribute and not the first attribute, according to the first security sensitivity.

3. The method of claim 1, wherein the first identity provider is permitted to populate the distributed database with both the first attribute and a third attribute, according to the first security sensitivity.

4. The method of claim 1, wherein the first signature is formed according to an entity key associated with the entity, and the second signature is formed according to an identity provider key associated with the identity provider, and wherein the first signature and the second signature are verified respective keys which correspond to the entity key and the identity provider key.

5. The method of claim 1, wherein the first attribute is any one of surname, given name, date of birth, taxpayer ID, social security number, state identification information, federal identification information, local identification information, personal identification photographs, or physical attributes.

6. The method of claim 1, wherein the second attribute is any one of a corporate name, an employer identification number, a taxpayer ID, an organization type, a ticker symbol, an address, a lot identifier, a number of floors, a building capacity, a building type, social media profile, or MAC address.

7. The method of claim 1, wherein receiving the data package includes receiving, by the requestor computing system via a close-proximity direct data connection, the data package from the entity computing system.

8. The method of claim 1, further comprising generating, by the requestor computing system, the approval message indicating that the digital identity attribute has been confirmed as both authentic and verified by an authorized generally recognized identity provider.

9. The method of claim 1, wherein accessing the distributed database is performed responsive to receiving the data package.

10. A requestor computing system comprising:
a network interface structured to facilitate data communication with an entity computing system and a distributed database;
memory; and
a processor configured to:
    access the distributed database maintained by a plurality of identity providers, each identity provider populating the distributed database with respective entries relating to attributes of entities, wherein a first identity provider populates the distributed database with a first attribute having a first security sensitivity and a second identity provider populates the distributed database with a second attribute having a second security sensitivity, wherein the distributed database comprises a historic record of identity information changes of the entities, the historic record updated responsive to the identity providers populating the distributed database with updated attributes;
    receive a data package from an entity computing system associated with an entity that is presenting a digital identification attribute for authentication, the data package including the digital identification attribute;
    request an entry including the digital identification attribute from the distributed database;
    receive the entry from the distributed database, the entry including a first signature formed by an entity private key associated with the entity and a second signature associated with an identity provider of the plurality of identity providers which populated the entry to the database;
    verify the first signature and the second signature, and that the identity provider has a security level for populating the entry to the database using an entity public key associated with the entity and a public key associated with the identity provider; and
    transmit, to the entity computing system, an approval message indicating that the digital identity attribute has been confirmed as both authentic and verified by an authorized identity provider.

11. The requestor computing system of claim 10, wherein the second identity provider is permitted to populate the distributed database with the second attribute and not the first attribute, according to the first security sensitivity.

12. The requestor computing system of claim 10, wherein the first signature is formed according to an entity key associated with the entity, and the second signature is formed according to an identity provider key associated with the identity provider, and wherein the first signature and the second signature are verified respective keys which correspond to the entity key and the identity provider key.

13. The requestor computing system of claim 10, wherein the first attribute is any one of surname, given name, date of birth, taxpayer ID, social security number, state identification information, federal identification information, local identification information, personal identification photographs, or physical attributes.

14. The requestor computing system of claim 10, wherein the second attribute is any one of a corporate name, an employer identification number, a taxpayer ID, an organization type, a ticker symbol, an address, a lot identifier, a number of floors, a building capacity, a building type, social media profile, or MAC address.

15. The requestor computing system of claim 10, wherein the processor is configured to receive, via a close-proximity direct data connection, the data package from the entity computing system.

16. The requestor computing system of claim 10, wherein the processor is further configured to generate the approval message indicating that the digital identity attribute has been confirmed as both authentic and verified by an authorized generally recognized identity provider.

17. The requestor computing system of claim 10, wherein the processor is configured to access the distributed database responsive to receiving the data package.

18. A non-transitory computer readable medium storing instructions that, when executed by one or more processors, cause the one or more processors to:

access a distributed database maintained by a plurality of identity providers, each identity provider populating the distributed database with respective entries relating to attributes of entities, wherein a first identity provider populates the distributed database with a first attribute having a first security sensitivity and a second identity provider populates the distributed database with a second attribute having a second security sensitivity, wherein the distributed database comprises a historic record of identity information changes of the entities, the historic record updated responsive to the identity providers populating the distributed database with updated attributes;

receive a data package from an entity computing system associated with an entity that is presenting a digital identification attribute for authentication, the data package including the digital identification attribute;

request an entry including the digital identification attribute from the distributed database;

receive the entry from the distributed database, the entry including a first signature formed by an entity private key associated with the entity and a second signature associated with an identity provider of the plurality of identity providers which populated the entry to the database;

verify the first signature and the second signature, and that the identity provider has a security level for populating the entry to the database using an entity public key associated with the entity and a public key associated with the identity provider; and transmit, to the entity computing system, an approval message indicating that the digital identity attribute has been confirmed as both authentic and verified by an authorized identity provider.

* * * * *